United States Patent [19]

Phillips

[11] Patent Number: 4,691,316
[45] Date of Patent: Sep. 1, 1987

[54] ROM EMULATOR FOR DIAGNOSTIC TESTER

[75] Inventor: Charles R. Phillips, Portland, Oreg.

[73] Assignee: Support Technologies, Inc., Tigard, Oreg.

[21] Appl. No.: 701,770

[22] Filed: Feb. 14, 1985

[51] Int. Cl.⁴ ............................................. G01R 31/28
[52] U.S. Cl. ........................................ 371/20; 371/16
[58] Field of Search ................... 371/20, 16; 364/200, 364/900, 578; 324/73 R, 73 AT

[56] References Cited

U.S. PATENT DOCUMENTS

| | | | |
|---|---|---|---|
| 4,315,321 | 2/1982 | Parks, III et al. | 364/900 |
| 4,317,199 | 2/1982 | Winslow | 371/16 |
| 4,433,412 | 2/1984 | Best et al. | 371/25 |
| 4,450,519 | 5/1984 | Guttag et al. | 364/200 |
| 4,455,654 | 6/1984 | Bhaskar et al. | 371/20 |
| 4,484,329 | 11/1984 | Slamka et al. | 371/20 X |
| 4,489,414 | 12/1984 | Titherley | 371/20 |

Primary Examiner—Charles E. Atkinson
Attorney, Agent, or Firm—Chernoff, Vilhauer, McClung & Stenzel

[57] ABSTRACT

A diagnostic test system for microprocessor-based electronics systems comprises a computer and a ROM emulator for emulating the read only memory in the device under test which provides the microprocessor with its start-up operating program. The ROM emulator gains control of the microprocessor in the device under test and causes it to run a series of diagnostic tests which are controlled from the test unit. Unique capture logic circuitry in the ROM emulator permits test data to be read over the system address bus.

18 Claims, 2 Drawing Figures

ROM EMULATOR FOR DIAGNOSTIC TESTER

BACKGROUND OF THE INVENTION

The following invention relates to a ROM emulator module to be used in conjunction with a diagnostic tester for testing or troubleshooting microprocessor-based electronic systems.

Microprocessor-based electronic systems such as microcomputers require test instrumentation capable of diagnosing and correcting system faults and faulty electronic components. Such diagnostic testers in the past have relied upon the technique of emulating the system's microprocessor or central processing unit in order to control the remainder of the system so that a series of diagnostic tests may be conducted which isolate the system's microprocessor from the remainder of the components. Microprocessor emulation performs two basic functions. In isolating the microprocessor from the remainder of its system components, it ma quickly be determined whether the microprocessor itself is faulty or whether the problem lies in some other component. Second, using an emulator to control the remainder of the system, rather than the system microprocessor, allows the diagnostic tester much more flexibility in exercising the remaining components of the system which might not otherwise be possible. This is due to the fact that the microprocessor in the system depends in large amount upon other system components in order to execute programs, and it is very likely that one or more of these other components could be the source of the problem. The diagnostic test routines can effectively remove these components from the system selectively or exercise these components from the microprocessor emulator in such a way that their functions are isolated from one another and diagnosis of the system may proceed in an orderly fashion.

The problem with such testers is, however, that they are expensive. A diagnostic tester using the microprocessor emulation technique is unique to the particular microprocessor used in the device under test (DUT). Since there are a large variety of different microprocessors currently in use in various types of systems, it can be very expensive to acquire a plurality of evaluators, one for each type of microprocessor. Due to the wide variations of ways in which microprocessors are structured, there is, as yet, no general-purpose microprocessor emulator available.

What is needed therefore, is a universal diagnostic test device which is capable of being used with any type of microprocessor without requiring separate circuitry for each type of microprocessor that might be encountered.

SUMMARY OF THE INVENTION

The present invention solves the aforementioned and other problems by providing a diagnostic tester having a programmable emulator which emulates the read-only memory (ROM) in a microprocessor-based system. Microprocessors almost universally rely on firmware in the form of ROMS to provide an operating program at least upon immediate start-up of the system. As the system "boots up" in response to instructions included in the ROM, other portions of the system may take over from the ROM and provide additional operating instructions. However at least in this initial phase, the microprocessor is under control of its system ROM. The ROM is relatively easy to emulate compared to the microprocessor since there are relatively few basic types of ROMS. Moreover, the electronic configuration of any ROM is relatively simple and may be duplicated in a random access memory.

The present system provides a means for gaining control of the microprocessor in the DUT by disabling the DUT ROM and inserting a ROM emulator which contains the same functional inputs and outputs, but provides operating instructions to the microprocessor in the DUT which cause it to run diagnostic test routines under the control of the diagnostic test unit. The ROM emulator may be connected via a ribbon cable to the DUT through the parallel I/O port provided for the DUT's ROM which is conventional in most microprocessor-based systems, especially microcomputers and the like.

The ROM emulator may be a modular unit which is connected to a general-purpose digital computer through a conventional VME interface bus. The unit includes an emulator random-access memory (RAM) which may be configured by the CPU in the general-purpose computer to emulate the ROM in the DUT, and logic circuitry including a latch control for reading diagnostic test results over the unit's address bus. In this way the unit may be connected to any general-purpose computer which includes a keyboard, display, and a central processing unit with system programming for running diagnostic tests.

The ROM in the DUT may be disabled by either physically removing it from the system or by electronically overriding its output levels with an override circuit which may be connected in parallel with the ROM in the DUT.

Since the ROM in the DUT cannot read data transmitted over the system data bus, a unique method is provided for extracting data from the DUT microprocessor in the form of encoded signals in response to diagnostic tests. This method involves causing the DUT microprocessor to encode test data signals as address locations and to transmit those signals over the system address bus. The data signals are encoded as lower order bits in an address location word with the higher order bits indicating a predetermined address location.

In the emulator RAM, a certain number of memory address locations corresponding to this location are set aside so that signals intended for those locations may be read as data. A capture logic section including a comparator connected to the address bus in the unit in parallel with the emulator RAM reads all incoming electronic signals and compares those signals with the predetermined set of address location codes. When coincidence exists in the comparator for the predetermined number of bits of each address word, the remainder of the word is latched. The remaining bits that are latched comprise a data signal word which represents test data generated as a result of diagnostic testing. In this way test data is read over the address bus and provided to the computer CPU which, in turn makes the data available for display.

Connected between the emulator RAM and its I/O port is a configuration switch which matches the emulator RAM to the configuration of the pins at the ROM I/O port in the DUT. The emulator also includes means for resetting the microprocessor in the DUT so that upon start-up of the system it will access the ROM I/O port where the emulator is connected.

It is a primary object of this invention to provide a universal diagnostic tester for microprocessor-based systems without the need for a separate microprocessor emulator.

Yet a further object of this invention is to provide a ROM emulator which may be used with a general-purpose computer for controlling the microprocessor in a DUT.

Yet a further object of this invention is to provide a programmable ROM emulator capable of causing a CPU in a DUT to execute diagnostic test programs and capable of reading the results of those programs over its system address bus.

Yet a further object of this invention is to provide a modular ROM emulator unit which may be connected between a general-purpose computer and a DUT by means of conventional wirinq and using conventional interfacing techniques.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
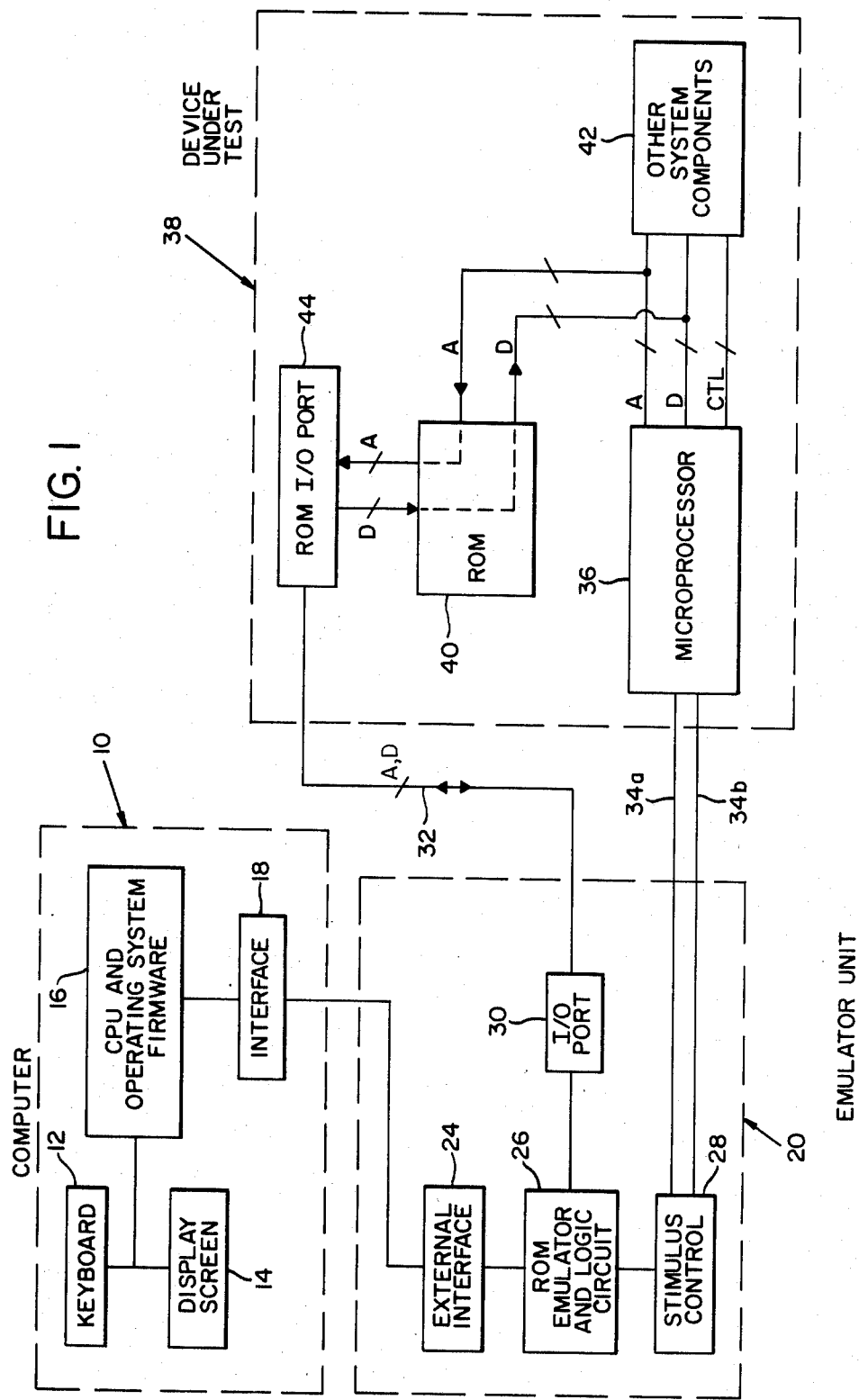
FIG. 1 is a system block diagram of a typical test setup including the diagnostic test unit, a ROM emulator unit and the device under test.

A general-purpose digital computer 10 includes a keyboard 12 and a display screen 14 coupled to central-processing unit and operating system firmware 16. The computer 10 also includes at least one interface 18 capable of accepting a VME bus or other general-purpose parallel interface line. The computer 10 may be configured as a special-purpose microcomputer adapted to perform diagnostic tests and to display and analyze the data resulting from those tests.

One of the peripheral devices which may be connected to such a computer 10 includes a ROM emulator unit 20. The emulator unit 20 includes a ROM emulator and logic circuit 26. The emulator unit 20 includes two outputa, one output for mode stimulus control 28 and the other output for input/output port 30. The input/output port 30 is a socket for a standard multiwire ribbon-connecting cable 32 containing at least address, data, and control lines (not separately shown). The outputs of the stimulus control 28 comprise conductors 34a and 34b which are connected directly to a microprocessor 36 in the device under test (DUT) 38.

The DUT 38 may be any microprocessor-based system but must include at least one microprocessor 36 and at least one read-only memory (ROM) 40 which is responsible for initiating the function of the microprocessor 36 upon start-up of the DUT 38. That is, ROM 40 must function to provide at least the initial signals which cause the DUT 38 to "boot up". The microprocessor 36 is connected in parallel with ROM 40 to the other system components, schematically illustrated at 42. The microprocessor 36 is connected to the ROM 40 via the address and data buses labeled A and D respectively in FIG. 1. Since the ROM 40 is a read-only memory, data flows only one way, that is, from the ROM 40 to the microprocessor 36. The only two-way communication link between the ROM 40 and the microprocessor 36 is via the address bus. The DUT 38 includes a ROM input/output (I/O) port 44 which includes a socket (not shown) adapted to receive a multiwire ribbon cable, represented schematically as cable 32. The socket connections of the I/O port 44 are respectively connected in parallel to the input and output pin connections for the integrated circuit chip representing ROM 40. Although only one ROM 40 and one I/O port 44 have been illustrated in FIG. 1, it is to be understood that microprocessor-based devices under test, auch as DUT 38, may be multiple-byte systems and thus may include additional ROMS such as ROM 40. In this case there would be multiple I/O ports and multiple connecting cables such as cable 32 in addition to two I/O ports such as I/O port 30 on the emulator unit 20.

The computer 10 drives the stimulus control 28 which includes amplifiers 50 and 51 having output reset lines 34a and 34b. These lines may be connected directly to pins on the microprocessor 36 in the DUT 38 by way of probes having alligator clips or the like (not shown). A random-access memory (RAM) 54 is connected to an I/O port 30 through a configuration circuit 56 and a multiplexing switch 58, the purpose of which will be explained below. The multiplexing switch 58 is connected, in turn, to one or more ZIF sockets 60 which may be located on the outside of the emulator 20 for the receipt of ROM chips which may be physically removed from the DUT 38. The multiplexing switch 58 is controlled by the computer 10 via line 62 from interface 24.

Figure 2:
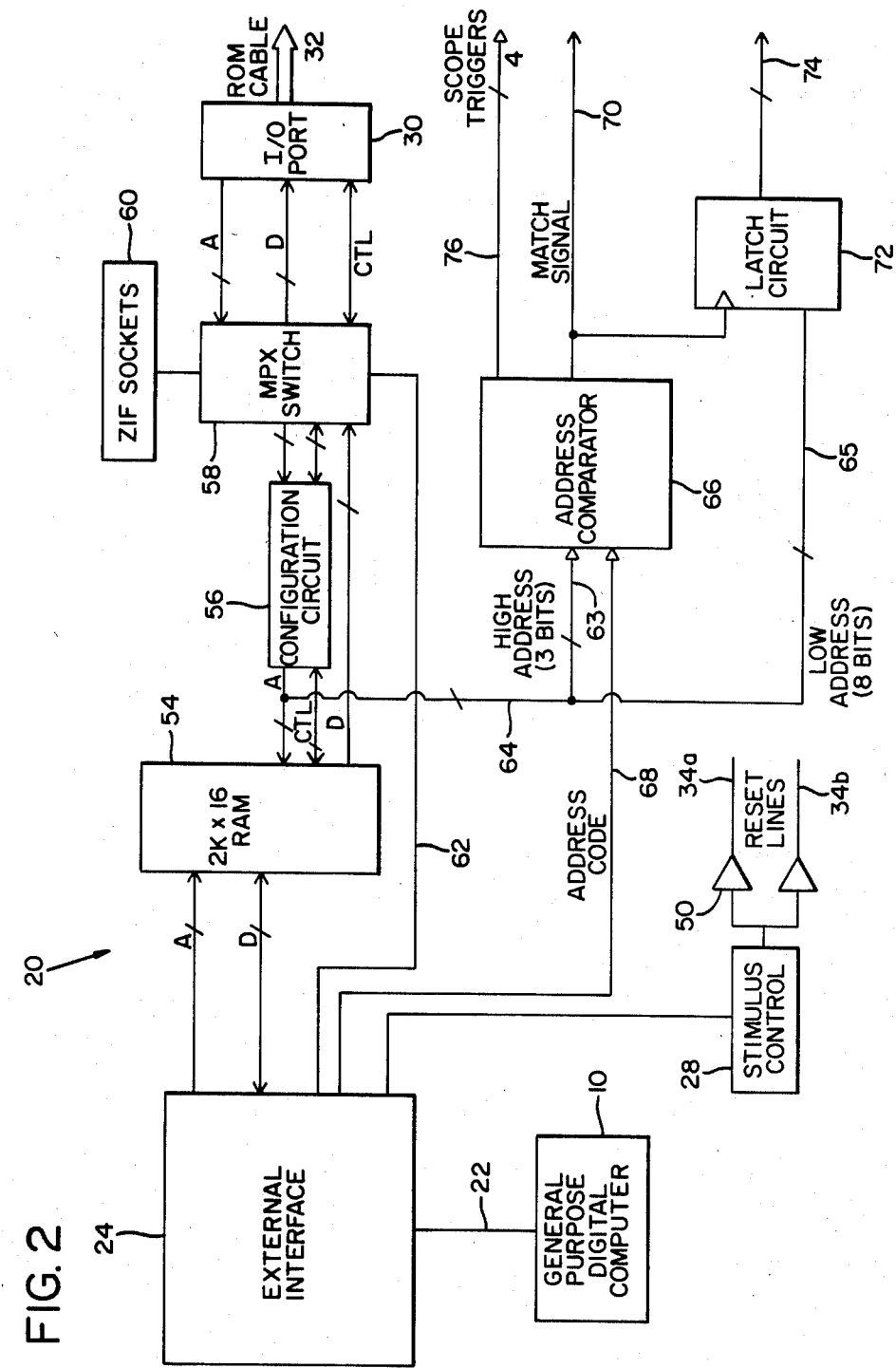
FIG. 2 is a functional block diagram of the ROM emulator unit shown in FIG. 1.

Connected to the address bus via a high address branch 63 of line 64 is an address comparator 66. A second input to address comparator 66 is address code line 68 connected to interface 24. The output of the address comparator 66 is a match signal line 70 which forms an input to a latch circuit 72. A second input to the latch circuit 72 is a low address line 65 representing the lower eight bits of address line 64. The latch circuit 72 has an output 74 which is connected to the computer 10 as is match signal line 70 (the connections are not shown on the drawing in FIG. 2). A second output of the address comparator 66 is a scope trigger line 76 which may be used to drive external peripheral devices such as oscilloscopes and the like (not shown).

In actual operation, the computer 10 may be programmed to command RAM 54 to configure itself to emulate the ROM 40. There are relatively few basic types of read-only memories currently in use in microprocessor-based systems and the task of providing for emulation of these few basic types of ROMS is not difficult. Once the RAM 54 is configured to emulate the ROM 40 in the DUT 38, it is additionally necessary to ensure the line compatibility between I/O port 30 and RAM 54 in order to functionally match the RAM pin connections with the cable 32 and ROM I/O port 44. This is accomplished by a configuration circuit 56 which ensures that the RAM 54 may communicate properly with the microprocessor 36 through the ROM I/O port 44. There are only a few basic configurations of ROM pin connections and thus configuration circuit 56 allows the RAM 54 to interface with these different devices.

The multiplexer switch 58 allows the user to access one or more ROM input ZIF sockets 60 located on the periphery of the emulator unit 20 and at the same time eliminate the ROM emulator RAM 54 from the circuit. This feature is particularly useful when the user wishes to perform A-B tests, switching between the ROM 40 from the DUT 38 to an emulator mode using the RAM 54. The function of the multiplex switch is controlled by control line 62.

Communication from the emulator unit 20 to the DUT 38 through the ROM I/O port 44 is a fairly straight-forward procedure since microprocessors are designed to read data directly from a ROM such as ROM 40 upon system start-up. A ROM, however, is generally not configured to read data from the data bus. That is, it has no data bus input. Therefore, in order to extract data from the DUT 38 which represents diagnostic test data generated by the microprocessor 36, it is necessary to use the address bus of the DUT 38. To accomplish this, a portion of emulator RAM 54 is set aside to provide a plurality of address locations which may be utilized for data transmission. The computer 10 includes a program which, when loaded into RAM 54, instructs the microprocessor 36 in the DUT 38 to transmit all diagnostic test data over the address bus to predetermined address locations. For example, if the address bus is capable of carrying eleven bits, the first three bits of each data word may constitute an address code, and the remaining eight bits of each data word may comprise signals representing the diagnostic test data. Line 64 in the emulator unit 20 which is connected to the address bus routes the higher three bits of the address bus to address comparator 66 over high address line 63. A predetermined set of address locations in RAM 54 are set aside and are programmed as a code from computer 10 on line 68. The address comparator 66 compares the first three bits of information on the address bus with the predetermined code from line 68 and if one of the predetermined address locations is present, the comparator 66 provides a match signal which enables latch 72 to latch the lower eight bits representing the test data on low address line 65. Thus the diagnostic test data is preserved in the latch circuit 72 and is routed via line 74 to the interface 24 which then transmits it to the computer 10 for analysis and display on display screen 14. At the same time, match signal line 70 notifies the computer 10 that diagnostic test data has been received. The comparator 66 also provides enabling signals over scope trigger line 76 to control peripheral devices (not shown) which may be monitoring certain portions of the device under test, thereby synchronizing those devices with the actual receipt of test data.

In order to ensure that the emulator 20 assumes control of the DUT 38, a stimulus control 28 is provided which includes reset lines 34a and 34b driven by amplifiers 50 and 51. These high output lines drive microprocessor 36 to a predetermined operating mode, typically reset, to ensure that upon start-up of the DUT 38, the microprocessor 36 draws its initial operating instructions from ROM 40. However, since the ROM 40 had been previously removed from the system, or disabled (as indicated by the dotted lines through the block designated 40), the microprocessor 36 will actually be drawing its operating instructions from the ROM emulator 20 through the parallel ROM I/O port 44.

It is not necessary for proper operation of the system that the ROM emulator 20 be confined to an outboard unit connected to the computer 10 through an interface 24. If desired, most of the circuitry for the ROM emulator 20 may be included in the computer 10 itself with only those components which need to be physically adjacent the DUT 38 included in an outboard unit. For example, a small outboard pod (not shown) including line buffer circuitry (not shown), ZIF socket 60, associated multiplex switch 58, and configuration circuit 56 could be provided. The pod would be attached to the end of a ribbon cable from the test unit 10 and would have a relatively short ribbon cable connecting it to the ROM I/O PORT 44. This would insure that the user ROM, when plugged into socket 60, would communicate with the DUT 38 with a minimum of signal degredation which might otherwise occur if the user ROM were required to communicate with DUT 38 over a long ribbon cable.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for testing an electronic system, said including a microprocessor and at least one ROM connected together by at least address and data busses, respectively, comprising:
    (a) a programmable ROM emulator connected to said electronic system through a ROM input-output port for bi-directionally communicating with said microprocessor in place of said ROM;
    (b) computer means connected to said ROM emulator for inserting test programs into said ROM emulator to be executed by said microprocessor; and
    (c) logic circuit means in said ROM emulator connected to a bus from said ROM input-output port in communication with said microprocessor for reading the results of the said test programs in the form of test data signals.

2. The apparatus of claim 1 further including stimulus control means connected to said ROM emulator for causing said microprocessor to adopt a predetermined operating mode.

3. The apparatus of claim 2 wherein said predetermined operating mode comprises a reset condition.

4. The apparatus of claim 1 wherein said ROM emulator includes means for causing said microprocessor to place said test data signals on said address bus.

5. The apparatus of claim 4 wherein said logic circuit means is in communication with said microprocessor over said address bus.

6. The apparatus of claim 1 wherein said ROM includes an input/output port through which said electronic system communicates with said programmable ROM emulator.

7. The apparatus of claim 6 wherein said ROM emulator includes configuration switch means for providing electrical compatibility between said ROM emulator and said input/output port.

8. The apparatus of claim 1 further including multiplex switch means for selectively inserting said ROM into said microprocessor-based system in place of said ROM emulator.

9. The apparatus of claim 1 wherein said ROM emulator comprises a RAM controlled by a programmable digital computer for simulating at least a portion of said ROM.

10. The apparatus of claim 9 further including configuration switch means for matching an output of said RAM to an input of said microprocessor-based system and cable-connecting means for coupling said RAM output with said input of said microprocessor-based system.

11. The apparatus of claim 5 wherein said logic circuit means includes comparator means for comparing electronic signals received over said address bus with a set of coded signals representing predetermined address locations and for providing an output signal when said electronic signals match said coded signals, said output controlling a latching means for storing at least a portion of said electronic signals in a memory.

12. The apparatus of claim 11 further including means for providing said output signal to a computer including a display device for notifying said computer that test data has been received.

13. The apparatus of claim 12 wherein said latching means includes an output trigger circuit usable by an external electronic device.

14. The apparatus of claim 1 further including means for receiving electronic signals intended for said ROM and for overriding output signals from said ROM in response to commands from said ROM emulator means.

15. A method of testing an electronic system, said system including a microprocessor and at least one ROM connected together by at least address and data busses, respectively, comprising the steps of:
 (a) disabling said ROM;
 (b) inserting in place of said ROM a ROM emulator programmed to command said microprocessor to execute a diagnostic test routine; and
 (c) commanding said microprocessor to place diagnostic test data resulting from said diagnostic test routine onto said address bus in the form of address codes.

16. The method of claim 15 wherein step (a) is accomplished by physically removing said ROM from said electronic system.

17. The method df claim 15 further including as step (d), comparing said address codes on said address bus with a code representing said predetermined address locations, and upon coincidence of said code with said electronic signals latching at least a portion of said electronic signals in a memory.

18. The method of claim 17 wherein said ROM is disabled electronically by overriding the output of said ROM.

* * * * *

UNITED STATES PATENT AND TRADEMARK OFFICE
CERTIFICATE OF CORRECTION

PATENT NO. : 4,691,316

DATED : September 1, 1987

INVENTOR(S) : Charles R. Phillips

It is certified that error appears in the above-identified patent and that said Letters Patent is hereby corrected as shown below:

Col. 1, line 20        Change "ma" to --may--

Col. 3, line 47        Change "outputa" to --outputs--

Col. 4, line 12        Change "auch" to --such--

Col. 6, line 23        After "said" insert --system--

Col. 8, line 14        Change "df" to --of--

Signed and Sealed this

Tenth Day of May, 1988

*Attest:*

DONALD J. QUIGG

*Attesting Officer*        Commissioner of Patents and Trademarks